Figure 1:
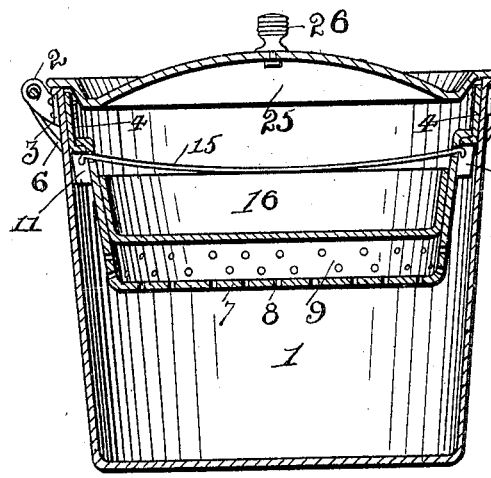

No. 812,590. PATENTED FEB. 13, 1906.
A. W. OBERMANN.
CULINARY VESSEL.
APPLICATION FILED MAY 17, 1904.

Witnesses.
C. A. Rudolph.
K. H. Butler.

Inventor:
A. W. Obermann.
By N. C. Evert & Co
Attorneys.

UNITED STATES PATENT OFFICE.

AUGUST W. OBERMANN, OF NEWCASTLE, PENNSYLVANIA.

CULINARY VESSEL.

No. 812,590.     Specification of Letters Patent.     Patented Feb. 13, 1906.

Application filed May 17, 1904. Serial No. 208,326.

*To all whom it may concern:*

Be it known that I, AUGUST W. OBERMANN, a citizen of the United States of America, residing at Newcastle, in the county of Lawrence and State of Pennsylvania, have invented certain new and useful Improvements in Culinary Vessels, of which the following is a specification, reference being had therein to the accompanying drawings.

This invention has relation to culinary vessels, and has for its object to provide a vessel of this type wherein a boiler, steamer, and strainer are combined in one vessel wherein each one may be used when desired for preparing different kinds of food.

Another object of my invention is to provide a vessel of this character which way be made of porcelain, glass, or other material, and I so construct the vessel that the same may be readily handled by those inexperienced in the art of cooking and have provided novel means whereby the wasting of food during the process of preparing the same is entirely dispensed with.

Briefly described, my improved culinary vessel comprises a strainer and steamer which are supported within the boiling vessel in such a manner that one or more foods may be prepared in the proper manner independently of each other, and I have so constructed each vessel that they may be handled independently of one another, means being provided in connection with each vessel whereby the handling of the same is greatly facilitated.

In connection with my improved vessel I have constructed means whereby the cover or lid of the vessel may be readily moved without touching the same, this operation often causing the person preparing the food to become scalded or otherwise injured from the steam emitting from the vessel.

The above construction will be hereinafter more fully described, and specifically pointed out in the claim, and, referring to the drawings accompanying this application, like numerals of reference indicate like parts throughout the several views, in which—

Figure 5:
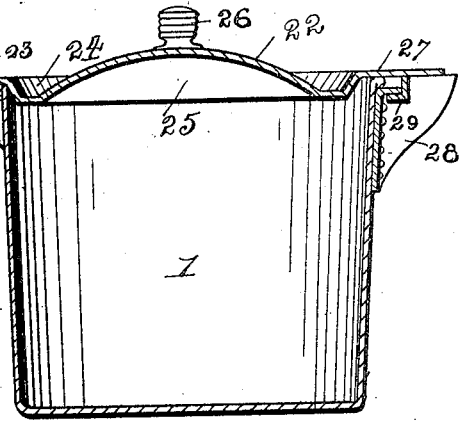
Figure 2:
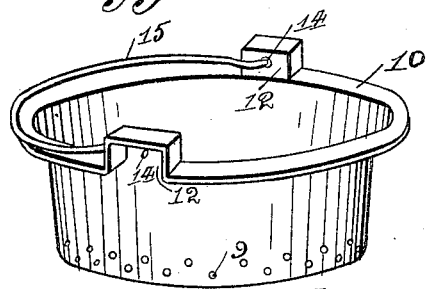
Figure 6:
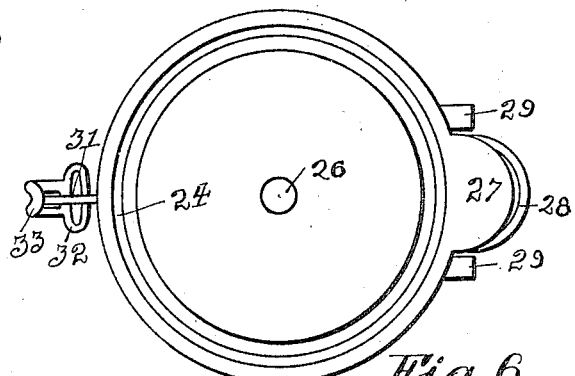
Figure 3:
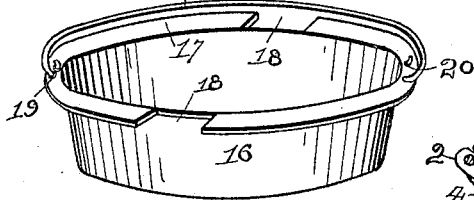
Figure 4:
Figure 7:
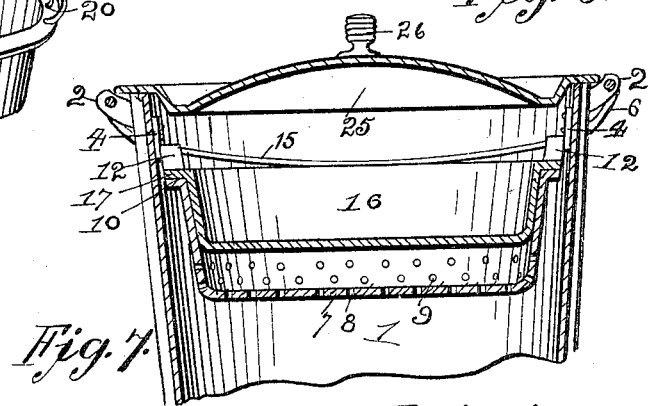

Figure 1 is a vertical sectional view of my improved culinary vessel. Fig. 2 is a perspective view of the strainer and steamer removed from the vessel. Fig. 3 is a perspective view of a boiler constructed in accordance with my invention. Fig. 4 is a detail perspective view of one of the brackets supporting the strainer and steamer within the vessel. Fig. 5 is a transverse vertical sectional view of the top part of the vessel shown in Fig. 1, showing the means employed for moving the lid or cover thereof, the said view Fig. 5 being taken on a line at right angles to the line on which Fig. 1 is taken. Fig. 6 is a top plan view of the vessel illustrated in Fig. 1 and Fig. 5. Fig. 7 is a vertical sectional view of my improved culinary vessel, this figure being similar to Fig. 1, but taken on a plane in front of the plane of which said Fig. 1 is taken.

In carrying my invention into effect I employ a vessel, as designated by reference-numeral 1, which is of a greater depth than the diameter of said vessel, and this vessel is provided with lugs 2 2 at the upper edge of the vessel, these lugs being disposed diametrically opposite each other and being secured to the side of the vessel by rivets 3, which pass through the vessel and secure the brackets 4 4 upon the inner sides of the vessel. The lugs 2 are pierced, as indicated at 5, whereby a bail 6 may be secured therein. Upon the brackets 4 4 is adapted to be supported a strainer or steamer 7, which is a vessel of a smaller diameter than the vessel 1 and of a depth of about one-half the depth of the first-named vessel. This strainer or steamer is provided with a plurality of apertures 8 in its bottom and for a short distance upon its sides, as indicated at 9. The top edge of the vessel 7 is flanged, as indicated at 10, said flanged portion being bent upwardly to form a yoke, as indicated at 11, these yoke portions being opposite each other, as shown in Figs. 1 and 2, and in the side walls 12 12 are formed apertures 14 14, in which a suitable bail 15 is mounted. A boiler 16, as illustrated in Fig. 3, is of a smaller diameter than either of the vessels heretofore described and is of less depth than the strainer or steamer. This vessel has its top edge flanged, as indicated at 17, said flange being cut away, as indicated at 18 18, whereby the same may be set within the strainer or steamer and rest upon the flange 10 of said vessel, the cut-away portions being provided, whereby the yoke portions 11 of the steamer may protrude through the flange 17 of the boiler, so that the strainer or steamer and the boiler may be removed from the vessel 1 together without detaching them from one another. The flange 17 is provided with apertures 19 20, said apertures being diametrically opposite each other, and in these apertures is secured a bail 21.

In Figs. 5 and 6 of the drawings I have shown means for moving the cover or lid 22, which is adapted to be placed upon the vessel when the same is being used. This lid or cover is provided with a flange 23, and the body portion of the cover is countersunk to form an inclined wall 24, said body portion being again bent to form a dome 25, in the center of which is secured a knob 26. The flange 23 is provided with an outwardly-extending portion 27, which is adapted when the lid or cover is seated upon the vessel to cover the spout 28, carried by the vessel 1. This spout is of the ordinary type and need not be more fully described. Upon each side of the outwardly-extending portion 27 I form downwardly-extending angular projections 29 29, which are adapted to engage angle-irons 30 30, carried by the side of the vessel 1 upon each side of the spout, and diametrically opposite the spout I secure an outwardly-extending slotted arm 31, in which arm is mounted a ring 32, having formed integral with it an upwardly-extending hook-shaped ring 33.

By the construction of my improved culinary vessel it will be readily seen that a vegetable may be steamed within the vessel 7 and a vegetable may be boiled within the vessel 16 while another vegetable is being cooked in the bottom of the vessel 1 and at any time that it is desired to remove the vegetable being boiled or steamed that these vessels may be taken out successively, beginning with the uppermost vessel, without interfering with the other vegetables being prepared in the remaining vessels; but should it become necessary to strain a vegetable the hook-shaped ring 33 is raised to engage the shoulder 24 of the lid or cover and is pulled rearwardly, moving the lid or cover into position as shown in Figs. 5 and 6 of the drawings, the lid or cover being held upon the vessel when the same is tilted to allow the fluid to pass through the spout by the downwardly-extending projections 29, which engage under the angular lugs 30 of the vessel. It will be seen by this construction that the lid may be removed at any time from the vessel when it is desired to remove the boiler or the boiler and strainer and that when the vessel is being tilted to pour the liquid from said vessel the lid will be held upon the top of said vessel without the person's hand coming in contact with the same.

Where it is desired to use the vessel as a steamer, the water placed in the vessel is not permitted to come into contact with the steamer, whereby the steam from said water will pass through the apertures 8 9 of the steamer and thoroughly steam any vegetable, such as rice or the like, therein, or the water may be placed in the vessel to such a height as to boil the vegetables within the strainer without permitting the said vegetables to enter the bottom of the vessel, where another vegetable may be prepared.

By the construction of the strainer or steamer 7 means is provided whereby the boiler 16 may be elevated within the strainer. To accomplish this, it is only necessary to lift the boiler 16 and turn the same, whereby the flange 17 of said boiler will rest upon the yokes 11 11 of the strainer.

Having fully described my invention, what I claim as new, and desire to secure by Letters Patent, is—

The combination of a receptacle having brackets upon its inner sides, a steamer provided with a flange having yokes thereon, a boiler having a flange with recesses for the reception of said yokes and a cover for the receptacle.

In testimony whereof I affix my signature in the presence of two witnesses.

AUGUST W. OBERMANN.

Witnesses:
WM. C. HEITZ,
E. E. POTTER.